Dec. 15, 1953  G. C. A. ALRIC  2,662,305
DEVICE FOR THE GUNNERY INSTRUCTIONS
Filed Sept. 7, 1950  4 Sheets-Sheet 1

Inventor
Gustave Charles Auguste Alric
by

Dec. 15, 1953  G. C. A. ALRIC  2,662,305
DEVICE FOR THE GUNNERY INSTRUCTIONS
Filed Sept. 7, 1950  4 Sheets-Sheet 2

Dec. 15, 1953  G. C. A. ALRIC  2,662,305
DEVICE FOR THE GUNNERY INSTRUCTIONS
Filed Sept. 7, 1950  4 Sheets-Sheet 3

Dec. 15, 1953  G. C. A. ALRIC  2,662,305
DEVICE FOR THE GUNNERY INSTRUCTIONS
Filed Sept. 7, 1950  4 Sheets-Sheet 4

Inventor
Gustave Charles Auguste Alric
by Michael S...

Patented Dec. 15, 1953

2,662,305

UNITED STATES PATENT OFFICE 2,662,305

DEVICE FOR THE GUNNERY INSTRUCTIONS

Gustave Charles Auguste Alric, Troyes, France

Application September 7, 1950, Serial No. 183,594

9 Claims. (Cl. 35—25)

The present invention relates to a device for gunnery instruction using a moving target, for instance for the instruction of anti-tank gunners and for the instruction of tank drivers or captains by putting the latter in conditions similar to that of a real battle, when they are submitted to the firing of an anti-tank gun.

This application is a continuation-in-part of the copending application Serial No. 763,971, filed July 26, 1947, and now abandoned.

One object of the present invention is to provide a device of the type referred to including means for projecting simultaneously on a screen representing the panorama of a battle field and on a conjugated screen showing the projection of the same field on a horizontal plane, a model of a tank such as seen in reality on the battle field by the gunner of an anti-tank gun and a luminous spot representing the position of the tank on the horizontal plane.

Another object of the invention is to provide a device including means rendering stereoscopic the projection of the model of the tank on the panorama. In addition, the image seen on the panorama is modified, as in reality, in terms of the distance and orientation of the tank and the shape of the field which may more or less mask said tank.

Another object of the invention is to provide a device of the type referred to including two projectors the movements of which are conjugated and one of which secures the stereoscopic representation of the tank on the panorama, whereas the other projector forms a luminous spot on the conjugated horizontal plane.

A further object of the invention is to provide a device including, in addition to the means mentioned above for representing the tank, means allowing an anti-tank gunner to aim his gun on the moving target and, possibly, to follow with his eyes the point of impact of his projectile. Simultaneously, if desired, the tank driver sees on the conjugated horizontal plane, the impact point of the projectile.

Another object of the invention is to associate with the device handled by the gunner and representing the antitank gun, projectors intended to produce the stereoscopic projection of the point of impact on the panorama and on the other hand the projection on the horizontal plane of the point of impact.

In order to produce conditions of use of the device which correspond to the real ones on the battle-field, the invention provides further means allowing the gunner to ascertain whether the projectile, which has been used, has reached its target or whether he has made errors in aiming, either in direction or in distance.

Another object of the invention is therefore to provide the means for producing the projection of the impact point of the projectile with means for recording instantaneously the data of the firing and to transmit the same to the means for projecting the impact point on the panorama, other means being provided for automatically moving said projecting means, after the shot has been fired, so as to project on the screen the representation of the real impact point of the projectile as fast as the latter moves towards the target, in the case where a tracing projectile is used.

Other objects of the invention will appear in the following description made with reference to the appended drawings in which:

Fig. 5 is a perspective view of an additional device to be used with the devices shown in Figs. 3 and 4.

Figure 1:
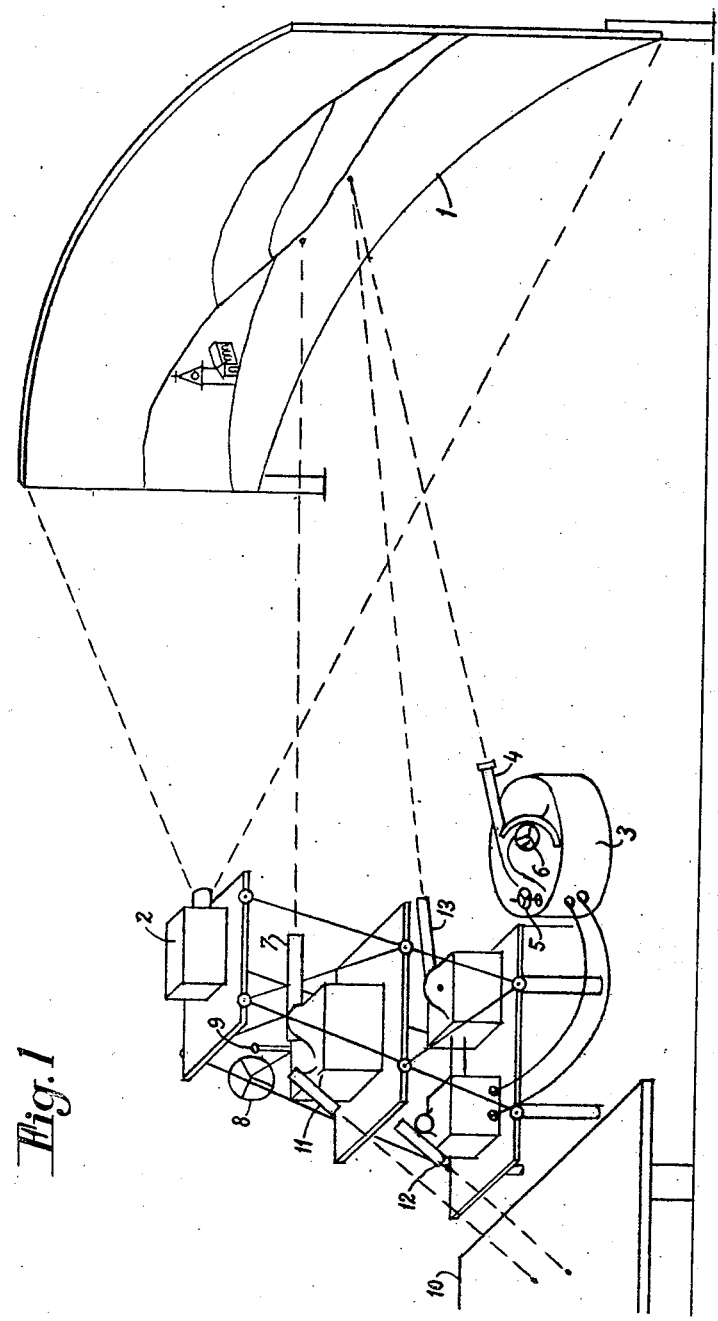
Fig. 1 shows in perspective and diagrammatically a device according to the invention.

The entire device, with its main component, is shown diagrammatically and in persepctive view in Fig. 1 and it should be noted that the components are shown in Fig. 1 neither on a right scale nor in the right relative position, in order to facilitate the understanding.

In the drawings, the reference numeral 1 represents a screen on which a projector 2 projects the panorama of a field such as seen by the gunner of an anti-tank weapon, who is supposed to be placed in a turret 3 the sighting telescope of which is denoted by the reference numeral 4. The panorama may also be drawn on the screen 1.

There may be also provided a relief projection of the panorama as explained hereafter for cooperation with the projection of the tank and that of the impact point. For this purpose, one may use light polarized by means of known devices, for instance polarizing screens placed on the stereoscopic views, the observers having corresponding polaroid-analyser spectacles in this case.

On the turret 3 are provided two levers or wheels 5 and 6 which are used by the gunner in aiming his gun. The target, which will be hereafter supposed to be a tank, is projected on the panorama 1 by means of a projector 7. An operator representing the tank driver is placed so as to have the projector 7 within hand reach, and directs the tank by means of a wheel 9, the displacements of which cause corresponding displacements of the projector 7, and, therefore, of the image of the tank made by the said projector on the screen 1. Moreover, the operator can vary the speed of the tank by means of a lever 9. He is therefore in conditions similar to the real ones, on a battle field.

The device comprises furthermore a conjugated plane 10 which represents in relief the piece of ground represented on the panorama. With the projector 7 is associated, in a manner which will be described in detail hereafter, a second projector 11 which indicates on the conjugated plane 10 the position of the tank at the same time as the projector 7 shows said position on the panorama. As the relief of the piece of ground is represented on the plane 10, the tank driver, following on this plane the displacements of his tank which are indicated to him by the luminous spot made by the projector 11 associated with the projector 7, can use this piece of ground at best and particularly the total or partial defilades which said piece of ground provides.

For the projection of the impact point of the projectile of the anti-tank gun which is represented by the telescope 4, there is provided, in a manner similar to that indicated hereabove for the representation of the tank, two conjugated projectors 12 and 13, projecting luminous spots respectively onto the plane 10 and onto the panorama 1. The co-ordinates of the anti-tank firing choosen by the operator through the working of the two wheels 5 and 6 are transmitted in a manner described hereinafter to the projectors 12 and 13.

All the mechanical and/or electrical transmission and co-ordination mechanisms and apparatuses are placed on a table or within a casing, not show, and having relatively little bulkiness.

The various members of the device will now be described more in detail with reference to Figs. 3 and 4.

*Projection of the tank (Fig. 3)*

Figure 3:
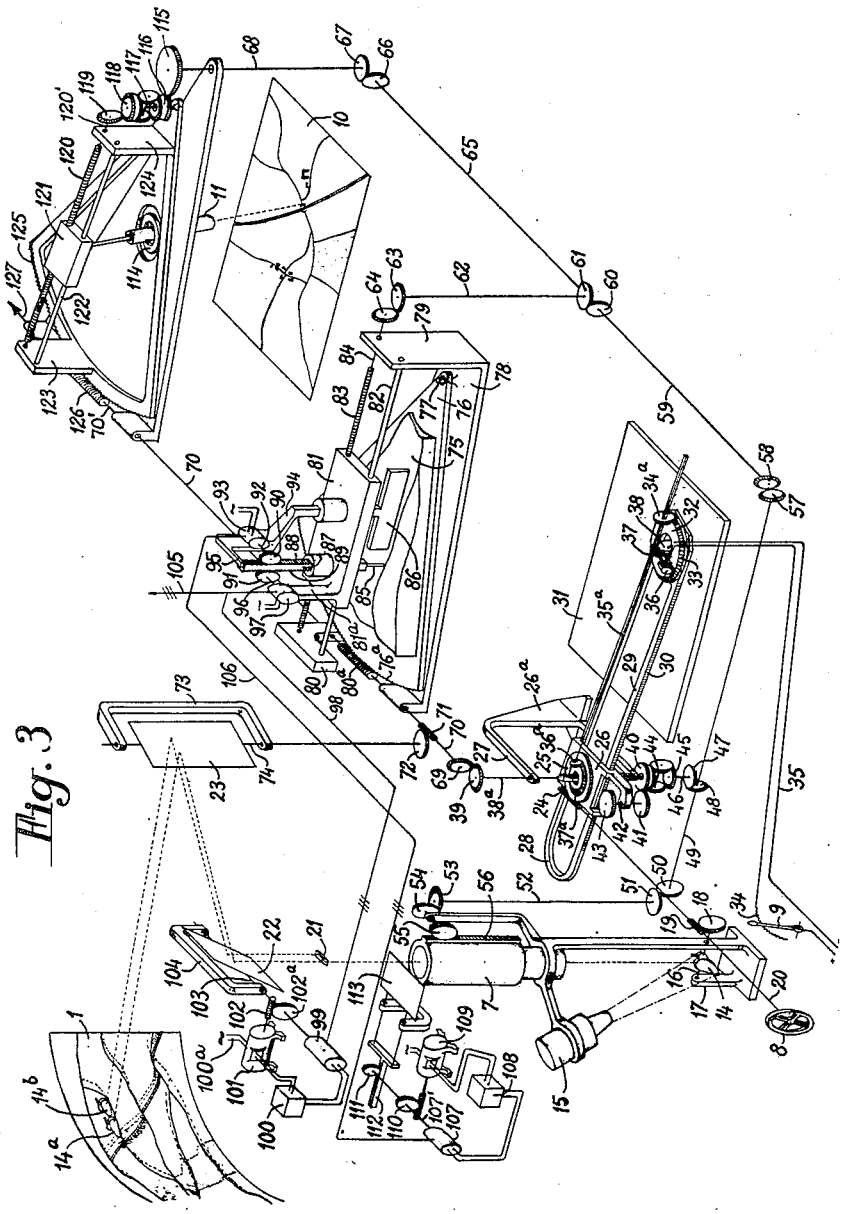
Fig. 3 is a perspective view of the means representing the moving target.
Figure 4:
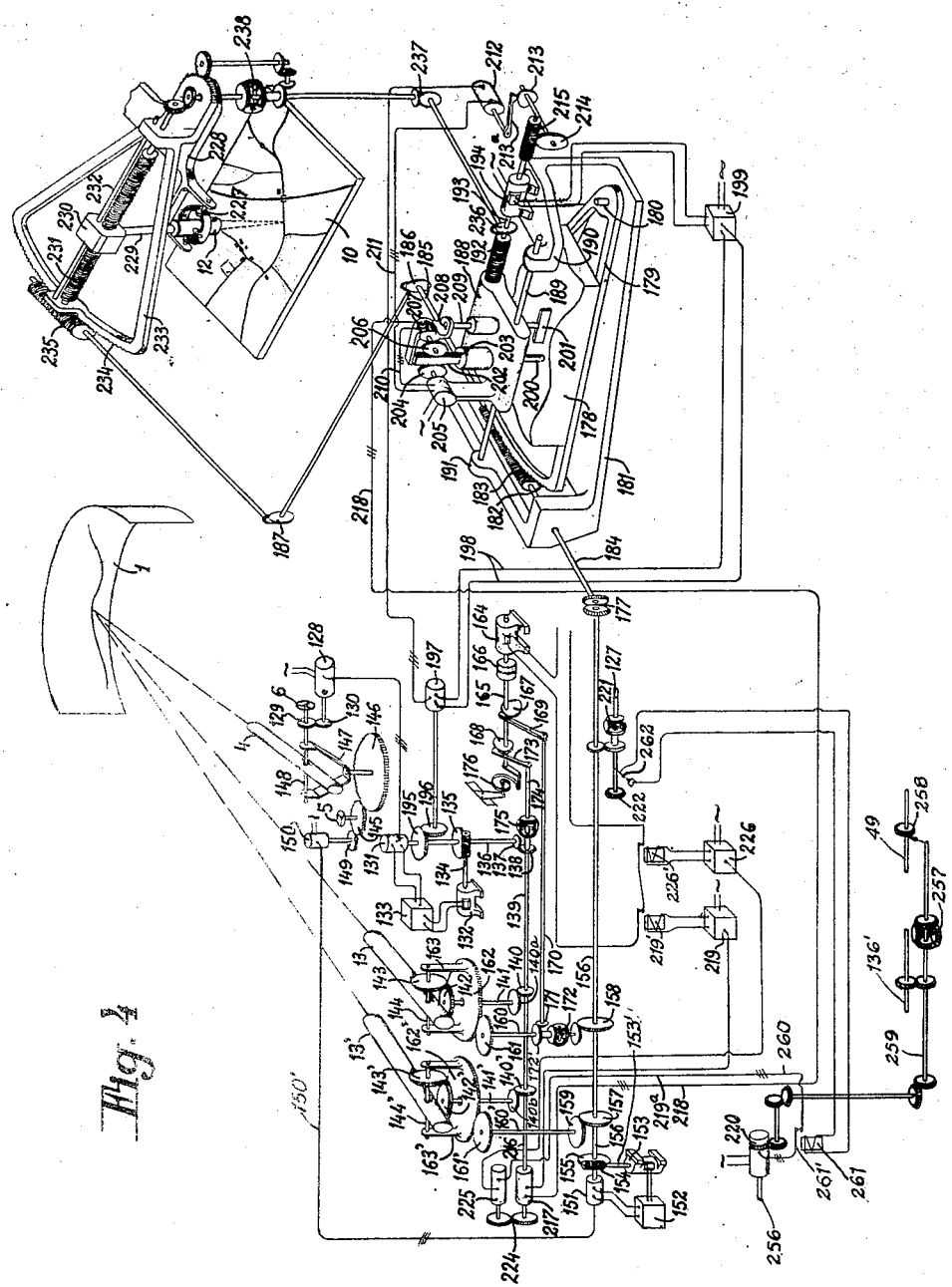
Fig. 4 is a perspective view of the means for producing the impact point of the projectile.

In Fig. 3 are shown the panorama 1, the projectors 7 and 11 and the members 8 and 9 allowing the tank driver or captain to vary, respectively, the direction and speed of his vehicle.

The tank is represented as a model 14 of relatively small dimensions which reproduces preferably as exactly as possible the outline and the visible components of the tank, such as casing, caterpillars, turret, loading and the like. The model 14 is advantageously covered with glass-balls or facets in order to make it brighter. It is lighted by one or more luminous sources 15 and is rigid with a shaft 16 journalled at both ends in a stationary support such as 17. On one of the ends of the shaft 16 is keyed a toothed wheel 18 meshing with a tangent-screw 19 rigidly connected to a shaft 20 on the end of which is fixed the wheel 8 referred to hereabove.

In the example shown, a stereoscopic projection of the model 14 is made on the panorama 1. For this purpose, a projector 7 is provided the direction of which is fixed and which has a magnifying power variable in terms of the distance between the gunner and the target viz of the tank. The luminous beam coming from the projector 7 is subdivided by a stereoscopic device 21 of known type such as a double refracting crystal, and sent onto the panorama 1 by a first mirror 22, the position of which varies in a manner described hereafter according to the angle of elevation of the tank, and a second mirror 23 the position of which varies in terms of the azimuth of said tank. At 14a and 14b on the panorama 1 the two stereoscopic images of the model 14 are formed which give to the observer, in reality, the impression of the relief of the tank on the ground. The stereoscopic device 21 may be formed by a semi-reflecting blade and a reflecting prism or by a deviating prism having a small top angle; this prism is arranged in the path of the luminous beam. The luminous radiations not passing through the prism form the image 14a whereas the luminous radiations passing through said prism are deflected and form the image 14b. In this case, the distance between the two images is constant. The stereoscopic device may, however, be variable and comprise, for example, two deviating prisms having each a small top angle and joined side by side, said prisms being pivotably mounted with respect to each other. The pivoting movement of these prisms, which varies the distance between the images 14a and 14b, is controlled by the wheel 8 so that said distance is the greater, the greater the distance of the tank from the observer is.

The rotations imparted to the shaft 20 by the wheel 8 are transmitted by a tangent screw 24 to a toothed wheel 25 freely mounted on a horizontal plate 26 of a U-shaped stationary support 26a having a horizontal upper part 27. In the support 26a is slidably mounted a member 28 shaped as a hair pin one prong 29 of which, carries on its outer lateral face a rack 30. The open end of the member 28 is freely movable on an horizontal plane 31 and carries a bevel wheel 32 rotating about a vertical axis.

The lever 9 acts on a rheostat 34 forming part of the extending circuit 35 of an alternating current motor 36 the shaft of which carries a worm 37 meshing with a toothed wheel 38. A bevel pinion 34a meshing with the wheel 32 is rigidly connected to a shaft 35a carrying a bevel pinion 36a meshing with a toothed crown 37a rigidly connected to the wheel 25. The center of said wheel is traversed by a vertical shaft 38a rotatably mounted in bearings provided, respectively in the horizontal parts of the support 26a. The shaft 38a carries at its upper end a bevel pinion 39 and at its lower end a toothed wheel 40, meshing with a wheel 41 keyed on one end of a shaft 42 to the other end of which is rigidly connected another toothed wheel 43 meshing with the rack 30. Following the toothed wheel 40 is provided a differential the planet gears of which are shown in 44 and 45 and the output shaft 46 of which carries a bevel pinion 47.

The intersection point of the vertical shaft 38a with the horizontal plate 26 represents the place of the gunner.

If the tank driver wishes to move his tank and adjusts to this end the wheel 8 and lever 3, he acts through the rheostat 34 and the motor 36 on the speed of rotation of the pinion 34a and through the free wheel 25 and the gears 34a—36a, on the position occupied by the prong 29 on the horizontal plate 26.

The azimuth of the tank given by the rotation of the shaft 38a is transmitted through the bevel pinion 39 secured to the upper end of the shaft 38a and through the wheel 40. The displacement of the prong 29, transmitted by the rack 30 to the pinions 43, 41 is, in the differential 40, 44, 45, added to the compensation of distance derived from the apparatus through the toothed wheel 40. The lower bevel pinion 47 which receives thus the movement of displacement in distance transmits this movement to a bevel pinion 48 keyed on a shaft 49. Through the bevel wheels 50, 51, the shaft 52 and the bevel wheels 53, 54, the said movement is transmitted to a pinion 55 meshing with a rack 56 rigidly connected to the projector 7 so as to modify the magnifying power of the latter in dependence on the distance as stated hereabove.

The same movement in distance is transmitted through a bevel pinion 57 rigidly connected to the shaft 49 to another bevel pinion 58 rigidly connected to a shaft 59. Through bevel gears 60, 61, this movement is transmitted through a shaft 62 and pinions 63, 64 to an elevation elaboration device which will be described hereafter and, through a shaft 65, bevel pinions 66, 67 and a shaft 68 to an apparatus controlling the displacements of the projector 11 projecting the image of the tank on the plane 10. The variations of the azimuth of the tank are introduced in the elevation elaboration device through the bevel pinion 39 which meshes with a pinion 69 keyed on a shaft 70. A worm 71 rigidly connected to said shaft transmits the variations of the azimuth, by means of a toothed wheel 72, to the mirror 23 which is fixed on an axle 74 pivotally mounted in a stationary support 73.

The device for elaborating the elevation in terms of the azimuth and the distance of the tank makes the image of the model 14 appear on the panorama 1 in a manner similar to that in which an anti-tank gunner would see the tank in a real action in view of the undulations of the ground between the fire station and the tank. In other words, said device is intended to modify on the panorama the projection of the model of the tank which may be masked more or less by the undulations of the battle-field. In order to attain this result, the elevation elaboration device which receives, as described hereabove, the indications of distance and azimuth through the pinions 64 and 69 respectively, comprises a cam shaped member 75 formed by a relief of the part of ground which is represented on the plane 10 and on the panorama 1. A plate 76, on which is fixed the relief 75, has the form of a circular sector and is pivotally mounted on a pin 77 fixed in a stationary support 78. The latter has two vertical parts 79 and 80, the part 80 having bearings for the shaft 70. The periphery of the plate 76 is provided with teeth 76a meshing with a worm 80a secured to the shaft 70. It is seen that the plate 76 and therefore the relief 75 secured thereto oscillates in a horizontal plane about the pin 77 according to the indications received by the pinion 69.

A carriage 81 is slidably mounted, above the relief 75, on a cylindrical guide-bar 82, and a worm 83 meshing with inner teeth of the carriage is provided for moving the carriage 81. The worm 83 is secured to a shaft 84 journaled at its ends in the vertical parts 79 and 80 of the support 78 and which carries the bevel pinion 64 referred to hereabove.

In the carriage 81 are mounted two feelers 85 and 86 vertically slidable and having their lower ends resting on the relief 75. The lower end of the feeler 85 is tapered whereas that of the feeler 86 is formed by an elongated member oriented in the longitudinal axis of the carriage 81. As the plate 76 rotates about the pin 77, both feelers vertically slide according to the undulations of the ground indicated by the relief 75. In case the ground slopes steeply, means for imparting a reciprocating movement to the feeler 86 are preferably provided. The feeler 85 is extended at its upper end by a rod 87 having a rectangular section and provided on its opposite faces with teeth 88, 89 so as to form racks with which two toothed wheels 90—91 are meshing. The toothed wheel 90 is keyed to a shaft 92 of a selsyn 93 secured to a support 94 which is an extension of the elongated feeler 86 and the bent end 95 of which rests on the upper end of the rod 87 being the extension of the feeler 85. The toothed wheel 91 is keyed to a shaft 96 of a second selsyn 97 mounted on the end of a projection 81a of the carriage 81. The indications of the selsyn 97 are transmitted through a line 98 to a receiving selsyn 99 followed by an amplifier 100 and adapted to control a servo-motor 101. As it is known, the amplifier 100 comprises a phase bridge or other device intended to dephase by 90° the voltage generated in the selsyn 97, and the motor 101 is a two phase motor, one winding of which is connected to the amplifier 100 and the other winding to an alternative source in 100a. The shaft of the servo-motor 101 carries a worm 102 meshing with a pinion 102a which is keyed to a shaft 103 secured to the mirror 22 and journalled in a stationary support 104. The modifications of the elevation of the tank on the ground are therefore transferred from the relief 75 to the mirror 22 interposed in the path of the stereoscopic beams coming from the projector 7. The same indications given by the tapered feeler 85 are transmitted through a line 105 to the device for projecting the impact point of the projectile which will be described hereafter.

The differential indications of the tapered feeler 85 with respect to the elongated feeler 86 are received by the selsyn 93. The voltages generated in the latter are transmitted through a line 106 to a receiving selsyn 107 the shaft 107' of which is connected by gears 110 to a motor 109. The shaft 107' drives furthermore a toothed wheel 111 meshing with a rack 112. A mask 113 is secured to the rack 112 and is arranged so as to reciprocate in front of the projector 7. However, this arrangement has been shown in order to simplify the figure, and it should be understood that in fact, the mask 113 should be placed near the real image of the tank.

It is clear that due to this disposition, if the tank, the displacements of which are detected on the relief 75 by the feeler 85, disappears behind an elevation, the selsyn 93 secured to the feeler 86 generates a current which causes the mask 113 to obturate the luminous beams coming from the projector 7. Thus the image of the tank on the panorama 1 becomes totally or partially invisible as in reality on a battle field the driver of a tank which is attacked by an anti-tank gun looks out for means of taking cover from the sight of the gunners of said gun by using at best the ground on which he stands.

For reasons of clarity, selsyns transmitting the altitudes of the tank and of the mask are shown. In fact, however, they should transmit the elevations of said tank and mask seen from the gun. It is therefore necessary to provide members correcting in simultaneously the distance and the altitude, the result being transmitted by the selsyn. This object is accomplished, for example, by placing the shaft 96 of the selsyn 97 above the rotation point 77 and by operating it by means of a sufficiently long rod resting on the feeler. Under these conditions, the selsyn 97 will rotate through an angle corresponding to the angle of elevation of the tank. A similar rod will be provided to take the place of the feeler 86 and operate the selsyn 93.

An electric solution of this problem may be used so that the variables the equilibrium of which is to be obtained are measured in altitude or in angle of elevation.

The representation of the tank is completed by the projection on the conjugated plane 10 of a luminous spot produced by the projector 11. The latter is hung on gimbals on a support 114 which is a homothetic representation of the plane 10 with respect to the axis of the gimbals. The support 114 received the indications of distance given by the wheels 34a, 40 and transmitted by the pinion 67 and the shaft 68. The toothed wheel 115 meshes, for this purpose, with a toothed wheel 116 keyed to the input shaft of a compensatory differential 117. The output pinion 118 of the latter meshes with a pinion 119 secured to the shaft 120' of a worm 120 with which a member 121 supporting the projector 11 is in engagement. The member 121 is guided by a rod 122 secured at its ends to two flanges 123, 124 secured to the support 114. The latter, made in the form of a circular sector, is provided with peripheral teeth 125 meshing with a worm 126 secured to an extension 170' of the shaft 70 through which the indications of azimuth are transmitted to the support 114. Thus it is clear that the projector 11 moves exactly according to the movements in distance and angle of elevation of the tank, or in fact of the model 14, caused by the wheel 8 and the lever 9. Therefore, the luminous spot made by the projector 11 corresponds to the projection of the position of the tank on the conjugated plane 10 of the position of the tank.

The shaft 70 is extended at 127 towards the device for representing the impact point which will be described more in details with reference to Fig. 4.

*Representation of the point of impact (Fig. 4)*

Figure 2:
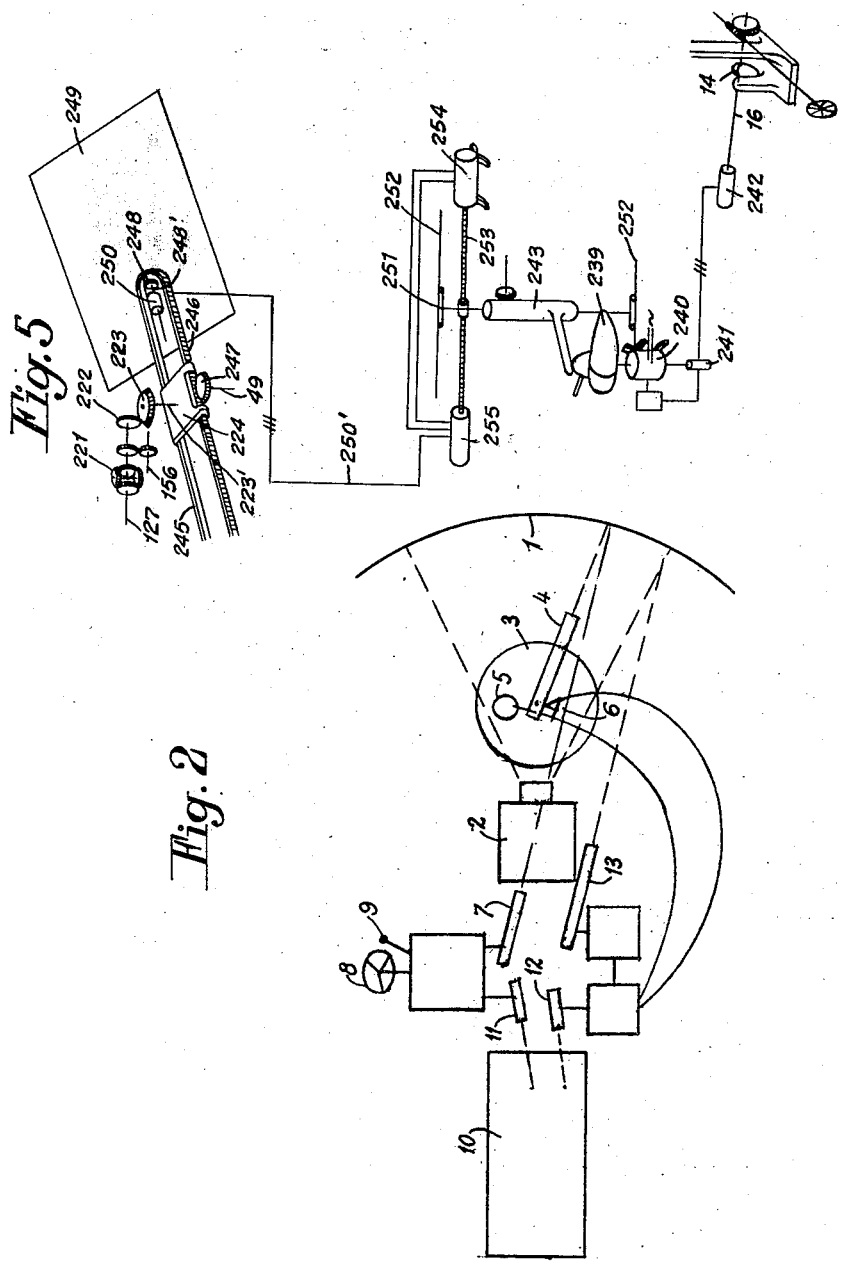
Fig. 2 is a diagrammatic plan view corresponding to Fig. 1.

In this figure are shown the panorama 1 and the sighting telescope 4 the pointing of which is controlled by the gunner through the wheels 5 and 6. The impact point of the projectile is shown on the conjugated plane 10 by a luminous spot coming from the projector 12. For the representation of the trajectory, one does not use a single projector 13 as diagrammatically shown in Figs. 1 and 2, but two projectors 13, 13', in order to obtain a stereoscopic representation of said trajectory.

The elevation displacements imparted by the gunning to the telescope 4 are transmitted to the conjugated projectors 13, 13', through gears 129, 130, a sending selsyn 128 and a receiving selsyn 131 which introduces to a motor 132 a voltage amplified by an amplifier 133. The motor 132 controls a shaft 136 through a worm 134 and a toothed wheel 135. Through bevel pinions 137, 138, the rotation of the shaft 136 is transmitted to a shaft 139 to which are keyed two bevel pinions 140, 140' associated, respectively, with the projectors 13 and 13' and meshing with pinions 140a, 140b keyed to the shafts 141, 141'. To the other ends of which are keyed bevel pinions 142, 142', respectively, meshing with bevel pinions 143, 143' keyed to the pivoting axles 144, 144' of the corresponding projectors 13, 13'. The elevation displacements of the telescope 4 are then identically transmitted to both projectors.

The azimuth variations due to the handling of the wheel 5 by the gunner are imparted to the telescope 4 through toothed wheels 145, 146, the latter carrying the support 147 of the axle 148 of the telescope 4. The variations are simultaneously transmitted through a wheel 149 meshing with the wheel 145 to a sending selsyn 150 and, from the latter by a conductor 150', to a receiving selsyn 151 which controls a motor 153 through an amplifier 152. To the shaft 153' of the motor 153 is keyed a worm 154 meshing with a wheel 155 which is secured to the shaft 156 of the selsyn 151. To the shaft 156 are keyed two bevel pinions 157 and 158 associated, respectively, with the projectors 13 and 13'. The pinion 157 meshes with a pinion 159 secured to a shaft 160' carrying a toothed wheel 161' meshing with a toothed plate 162' on which is mounted a support 163' in which the axle 144' of the projector 13' is journalled. The projector 13' is thus pointed directly from the gunner's station 5—6.

The adjustment of the projector 13 is carried out in an analogous manner through the hand wheel 5 but, in order to produce a real stereoscopic projection of the trajectory, a device, for introducing the variations of the distance, is interposed between the pinion 159 and the toothed plate 162 having flanges in which the axle 144 of the projector 13 is journalled.

This device comprises a constant speed motor 164 which, through relay means 219', 226', is connected when the shot starts and automatically disconnected when the projectile reaches its aim. The shaft 165 of the motor 164 is connected, through a coupling member 166, for instance a claw clutch, to two cams 167, 168. The profile of the first cam 167 is so shaped as to correspond to the distance of the position of the projectile and that of the second one to the lowering of said position in proportion as the projectile moves on its trajectory. A finger 169 is permanently in contact with the periphery of the cam 167 and determines a corresponding rotation about the axis thereof a shaft 170. To the end of the shaft 170 is keyed a pinion 171 which introduces via the output wheel 172' of a differential 172 to the shaft 160 a value which is dependent on the instantaneous variations of the distance between the projectile and the gun. The projector 13 moves therefore, in elevation, in a manner different from that of the projector 13' and projection of two stereoscopic perspectives of the tracing projectile, results therefrom, each of the said perspectives being advantageously made with polarized light as indicated hereabove.

On the periphery of the cam 168 rests a finger 173 controlling the rotation of a shaft 174 about the axis thereof at the end of the shaft 174 is mounted a differential 175 through which the change in height of the impact point is applied, when the constant speed motor 164 rotates, i. e. when the shot starts, to the elevation shaft 139 of both projectors 13 and 13'. At the end of the shaft 165 of said motor 164 is provided return means formed by a spiral spring 176 which is wound when the shaft 165 rotates, i. e. during the time between the start of the projectile and its arrival, and which is released by bringing the whole of the device in its initial position, owing to the coupling member 166, as soon as the motor 164 stops.

The azimuth given by the gunner through the wheel 5 and which is found on the shaft 156, as explained above, is transmitted through bevel pinions 177 to the elevation elaboration device. The latter is similar to the corresponding device used for representing the tank and comprises a relief member 178 showing the battlefield in relief and which is fixed on a support 179 having the shape of a circular sector and pivoted by means of a pin 180 on a support 181. The sector 179 has at its periphery teeth 182 meshing with a worm 183 keyed to a shaft 184 to which the motion is transmitted by the pinions 177. The sector 179 pivots therefore about the pin 180 according to the azimuth displacements desired by the gunner. The shaft 184 is extended at 185 and transmits its rotation, through the bevel pinions 186 and 187, to the means projecting the projectile on the conjugated plane 19 which will be described hereafter.

Above the member 179 is longitudinally slidably mounted a carriage 188 guided by a cylindrical rod 189 which is fixed to two flanges 190, 191 secured to the stationary support 181. Displacements are imparted to the carriage 188 through a worm 192 meshing with corresponding inner teeth of the carriage 188. The shaft 193 carrying the worm 192 is rotated by a motor 194 which is controlled by the elevation elaboration device of the telescope 4 through bevel pinions 195, 196, the selsyn 197, the line 198 and the amplifier 199.

The control of the motor 194 is corrected by a selsyn 212 which introduces the lowering of the point of impact of the projectile through a cam 213, having a suitable profile, on the periphery of which rests an arm 213a and which is rotated by the shaft 193 via a toothed wheel 214 and a worm 215. This lowering may be introduced either in angle of elevation or in true altitude. Moreover, this control is corrected by a selsyn 205 which introduces the angle of elevation of the ground given by the feeler 200. It is to be noted in this connection, as indicated for the device for elaborating the elevation of the tank, that I have represented, on Fig. 4, selsyns 206, 207 introducing altitudes of the ground. As explained hereabove with reference to the representation of the tank, I provide a mechanical or electrical transforming device, so that the three variables the equilibrium of which is to be produced are all measured in altitude or in angle of elevation.

Due to the control, corrected as indicated above, the motor 194 acts in the suitable direction and continuously as soon as the gunner acting on the wheels 5 and 6 varies, before any shot, the pointing angle of the firing. At the departure of the projectile, the motor 164 starts with a constant speed. A gear or trigger may be provided on the telescope 4 representing the aim, on which the firer has to act to cause the departure of the projectile and which is made in the form of an interrupter.

As soon as the motor 164 starts, the projectors 13 and 13' project the two perspectives of the luminous spot which follow the above described movements. The elevation movement of the projectile is received through a selsyn 217 provided at the end of an extension 216 of the shaft 139. On the other hand, the angle of elevation of the feeler 200 and that of the feeler 201 are transmitted to the selsyn 217 through a second winding of the selsyn 205 which winding is connected by means of the line 210 to the selsyn 207 which is connected to the selsyn 217 through a line 218. When the angle of elevation of the projectile, received by the selsyn 217 is equal to the angle of elevation of that of the feelers 200 or 201 which is higher, the feeding of the motor 164 is switched off by means of an impulse given to a relay 219 by the selsyn 217 through a line 219a. The stopping of the motor 164 indicates the end of the trajectory either through disappearing behind a mask of the ground or through impact. The representation of this end of trajectory is different according as it is controlled by the feeler 200 (impact) or the feeler 201 (mask). In order to attain this result, a contact may be provided between the upper end of the rod of the feeler 200 and the extension of the rod of the feeler 201 which is curved at its upper end. When the feeler 201 is higher than the feeler 200, i. e. when the point of impact disappears behind a mask, the representative luminous spot disappears whereas in the other case, i. e. a visible impact, the impact spot is given, by means of the mentioned contact, a different shape or a supplementary flash, in order to represent the explosion.

Further a representation of the disappearing of the trajectory behind the tank is provided and also the representation of the point of impact of the projectile on said tank with, i. e. it, a representation of the explosion, if the tank is assumed to be destroyed by the projectile. The device producing this representation is advantageously constructed on a larger scale than those above described, due to the fact that it is necessary to specify the position of the impact point only in the neighbourhood of the tank, as will be shown hereafter. This device operates, in a manner similar to that indicated above, for the means representing the positions of the tank and impact points, as an apparatus causing the projectile to appear on a suitably placed model of the tank. According to the type of ammunition chosen by the gunner and the point of impact on the model of the tank, it is possible, either through workings of the instructors or through easily conceivable automatic means, to estimate whether the tank has not suffered any damages, or is only immobilized but able to fire, or has been destroyed.

To attain this result, I use preferably a device (Fig. 5) in which the ground does not need to be shown and which includes, on a larger scale than the above described devices, a model 239 of the tank. This model 239 is maintained in its relative position with respect to the firing plane through a servo-motor 240 controlled by a selsyn 241. The latter is connected to a selsyn 242 controlled by the shaft 16 to which the model 14 is rigidly secured. A feeler 243, shaped as a set square and disposed vertically with respect to the point of impact on the ground, determined as described hereabove, starts moving downward above the model 239 of the tank at the departure of the projectile. The positioning of the model 239 is obtained from the azimuth of the tank derived from the extension 127 and the azimuth of the firing derived from the shaft 156 which control a differential 221, indicating thus the difference of the azimuths. The differential 221 controls through pinions 222 and 223 a shaft 223' forming the axis of rotation of a plate 244 in which a hairpin 245 is slidably mounted. One fork of said pin carries on its outer lateral face a rack 246 with which meshes a toothed gear 247 rigidly connected to the shaft 49 indicating, as has been said hereinabove, the distance from the tank to the gunner. A roller 248 in contact with a plate 249 has an axle 248' carried by the pin 245 and controls a selsyn 250, the latter giving thus the distance from the tank to the firing plane.

The above mentioned feeler 243 is supported by a carriage 251, slidably mounted on rails 252 and driven by a screw 253 which is rotated to said screw by a servo-motor 254 controlled by a selsyn 255 connected to the selsyn 250 by a conductor 250'. Therefore the downward vertical movement of the square feeler 243 stops when the latter meets the highest point of the tank model 239. The thus given altitude indications of the feeler 243 are transformed into angles of elevation through one of the above described mechanical or electrical devices and added to the angle of elevation of the base of the tank given by the cam-member 75 in 105 (Fig. 3). The angle of elevation of the top of the tank which is so obtained controls a shaft 256.

It is necessary, to determine the intersection of the trajectory with the plane of the tank or with a plane in its vicinity. For this purpose, I introduce, in a differential 257 (Fig. 4), on the one hand, the firing angle given through a shaft 136' and, on the other hand, the angle of the lowering of the impact point with respect to the distance of the tank which is given through a cam 258 of a suitable profile, similar to the cam 168, which rotates proportionally to the distance of the tank. This differential controls a shaft 259.

I dispose thus finally of two shafts, the shaft 259 which rotates of through an angle which is a function of the elevation of the impact point with respect to the plane of the tank and the shaft 256 which rotates through an angle which is a function of the elevation of the top of the tank. By means of these two shafts, I drive a selsyn 220 connected by a line 260 including a contact 261' of relay 261 to a selsyn 225 synchronized mechanically by means of the toothed wheels 224 with the selsyn 217. The relay 261 is controlled through a switch 262 by the differential 221 so that this relay 261 is fed with currents and therefore the selsyn 220 is connected to the selsyn 225 only when the firing direction is substantially correct. The selsyn 225 controls a relay 226 adapted to switch off the feeding of the motor 164 by means of its contact 226'.

Thus it is seen that the selsyn 217 secures the interruption of the trajectory by means of the relay 219 in the case of a natural obstruction or impact. The selsyn 225 which is in action only when the firing plane meets the tank, secures the interruption of the trajectory through the relay 226 when a long shot passes behind the tank.

When the firing direction is not correct, the trajectory disappears, this disappearing being secured by the relay 219. When the firing direction is correct and the shot is short the disappearing of the trajectory is secured by the relay 219, but when the shot is long the disappearing is secured by the relay 226.

The projection of the point of impact on the conjugated plane 10 is made in a manner similar to that described with reference to the representation of the tank. The projector 12 is suspended in gimbals 227 front a support 228. It is extended by a rod 229 secured to a carriage 230 slidably mounted on a worm 231 and guided by a rod 232. The assembly is mounted on a sector 233, the peripheral teeth 234 of which are meshed with a worm 235 adapted to be rotated through bevel pinions 187 receiving the azimuth indications as described hereabove. The elevation indications are transmitted, from a bevel pinion 236 secured to the shaft 193, to bevel pinions 237 and, from the latter, through differential gear 238, to the toothed sector 233 and the worm 231. The luminous spot coming from the projector 12 is thus projected on the plane 10 so that, if desired, the tank driver and the gunner can follow on this plane the displacements of the vehicle and one the impact point of the projectile.

In the device means may be provided for taking account the kind of ammunition which is used, by example by providing different cams 168 and 213, the explosion of the tank, if the latter is reached, being represented only when the suitable ammunition has been used by the gunner. As a matter of fact, the cams 168 and 213 which are used for taking into account the lowering of the trajectory in terms of the distance are established from the firing tables and therefore should be replaced if the material or ammunition is changed.

It results from the foregoing that, with the device according to the invention, it is possible to produce a representation of the tank and of the point of impact of the projectile which correspond in every point to reality. For instance, on the battlefield, zones may be provided which are prohibited for the tanks (trenches, minefields) and zones that the tank can traverse only at a reduced speed. A certain route or track may be also imposed to the tank-driver.

What I claim is:

1. Device for the gunnery instructions on a moving target comprising a substantially vertical screen and a substantially horizontal plane representing a piece of ground, an orientable model simulating a moving target, means for displacing said model, means for projecting an image of said model on said vertical screen, means for transforming the displacements imparted to the model into displacements of said means for projecting the image of the movable target on the screen, means associated with said image projecting means for projecting on the plane a luminous spot representing the moving target, a sighting telescope representing the gun firing on the moving target, means for pointing this telescope in azimuth and elevation, means for directing to said vertical screen a beam of light representing the trajectory of a projectile supposedly fired by said gun, means for adjusting said directing means in dependence on the azimuth and elevation of said telescope, and means associated with said directing means for projecting on said plane a luminous point representing the point of intersection of the trajectory with the ground.

2. Device for the gunnery instructions on a movable target comprising a vertical screen and a horizontal plane representing a piece of ground, an orientable lighted model simulating a movable target, means for displacing said model, a variable magnifying projector, means for generating luminous beams by said projector, means for duplicating the luminous beams generated by said projector, movable members for reflecting the duplicated beams on said vertical screen, means for transmitting the displacements imparted to the model to said reflecting members, means associated with said magnifying projector for projecting on said plane a luminous spot representing the moving target, a sighting telescope representing the gun firing on the moving target, means for pointing this telescope in azimuth and elevation, means for directing to said vertical screen a beam of light representing the trajectory of a projectile supposedly fired by said gun, means for adjusting said directing means in dependence on the azimuth and elevation of said telescope, and means associated with said directing means for projecting on said plane a luminous point representing the point of intersection of the trajectory of the projectile with the ground.

3. Device for the gunnery instructions on a movable target comprising a vertical screen and a first plane representing a piece of ground, an orientable lighted model simulating a movable target, means for determining the azimuth and elevation of the target, means for displacing said model, a variable magnifying projector, means for generating a luminous beam by said projector, means for duplicating the luminous beam generated by said magnifying projector, movable members for reflecting the duplicated beams, a cam shaped member comprising a second plane having a map relief surface, a support having the shape of a circular sector and supporting said second plane, a pin arranged at the center of the periphery of said circular sector forming said support, a carriage slidably mounted above said second plane having a map relief surface in said support, two feelers arranged in said carriage and vertically sliding in said carriage by following the map relief surface of said second plane, said circular sector and support being connected, respectively, with said means for determining the azimuth and elevation of the target and adapted for transmitting these determined indications to reflecting movable members, means associated with said magnifying projector for projecting on said first plane a luminous spot representing the moving target, a sighting telescope representing the gun firing on the moving target, means for pointing this telescope in azimuth and elevation, means for directing to said vertical screen a beam of light representing the trajectory of a projectile supposedly fired by said gun, means for adjusting said directing means in dependence on the azimuth and elevation of said telescope, and means associated with said directing means for projecting on said first plane a luminous point representing the point of intersection of the trajectory of the projectile with the ground.

4. Device for the gunnery instructions on a movable target comprising a vertical screen and a first plane representing a piece of ground, an orientable lighted model simulating a movable target, means for displacing said model, a variable magnifying projector, means for generating a luminous beam by said magnifying projector, means for duplicating the luminous beam generated by said magnifying projector, movable members for reflecting the duplicated beams, a cam shaped member comprising a second plane having a map relief surface, a support, having the shape of a circular sector and supporting said second plane, a pin arranged at the center of the periphery of said circular sector forming said support, a carriage slidably mounted above said second plane in said support, two feelers arranged in said carriage and vertically sliding in said carriage by following the map relief surface of said second plane, a first selsyn registering the variations of the altitude of the ground at the point supporting one of the feelers the end of said one feeler being tapered, said one feeler representing the movable target, means for transforming indications of altitude from said first selsyn into indications of angle of elevation, means for transmitting the latter indications to one of said reflecting movable members, a second selsyn registering the variations of altitude of the ground in the firing plane between the place where the gunner is located and the movable target and controlling a mask adapted to be disposed on said variable magnifying projector when the movable target is hidden from the gunner by an obstructing part of the ground, means associated with said magnifying projector for projecting on said first plane a luminous spot representing the moving target, a sighting telescope representing the gun firing on the moving target, means for pointing this telescope in azimuth and elevation, means for directing to said projecting on the vertical screen a beam of light representing the trajectory of a projectile supposedly fired by said gun, means for adjusting said directing means in dependence on the azimuth and elevation of said telescope, and means associated with said directing means for projecting on said first plane a luminous point representing the point of intersection of the trajectory of the projectile with the ground.

5. Device for the gunnery instructions on a movable target comprising a vertical screen and a first plane representing a piece of ground, an orientable lighted model simulating a movable target, means for displacing said model, a variable magnifying projector, means for generating a luminous beam by said magnifying projector, means for duplicating the luminous beam generated by said magnifying projector, movable members for reflecting the duplicated beams, a cam shaped member comprising a second plane having a map relief surface, a first support having the shape of a circular sector and supporting said second plane, a pin arranged at the center of the periphery of said circular sector forming said first support, a carriage slidably mounted above said second plane in said first support, two feelers arranged in said carriage and vertically sliding in said carriage by following the map relief surface of said second plane, a first selsyn detecting the variations of the altitude of the ground at the point supporting one of the feelers, the end of said one feeler being tapered, said one feeler representing the movable target, means for transforming indications of altitude from said first selsyn into indications of angle of elevation, means for transmitting the latter indications to one of said reflecting movable members, a second selsyn registering the variations of altitude of the ground in the firing plane between the place where the gunner is located and the movable target and controlling a mask adapted to be disposed on said variable magnifying projector when the movable target is hidden from the gunner by an obstructing part of the ground, a second projector, a second support, gimbals for suspending said second projector from said second support, means for transmitting to said second support indications of angle of elevation and azimuth from said cam shaped member, said second projector projecting on said first plane a luminous spot representing the position of the movable target on the ground, a sighting telescope representing the gun firing on the moving target, means for pointing this telescope in azimuth and elevation, means for directing to said vertical screen a beam of light representing the trajectory of a projectile supposedly fired by said gun, means for adjusting said directing means in dependence on the azimuth and elevation of said telescope, and means associated with said directing means, for projecting on said first plane a luminous point representing the point of intersection of the trajectory of the projectile with the ground.

6. Device for the gunnery instructions on a movable target comprising a vertical screen and a first plane representing a piece of ground, an orientable lighted model simulating a movable target, means for displacing said model, a variable magnifying projector, means for generating a luminous beam by said magnifying projector, means for duplicating the luminous beam generated by said magnifying projector, movable members for reflecting the duplicated beams, a cam shaped member comprising a second plane having a map relief surface, a first support having the shape of a circular sector and supporting said second plane, a pin arranged at the center of the periphery of said circular sector forming said first support, a carriage slidably mounted above said second plane in said first support, two feelers arranged in said carriage and vertically sliding in said carriage by following the map relief surface of said second plane, a first selsyn detecting the variations of the altitude of the ground at the point supporting one of the feelers, the end of said one feeler being tapered, said one feeler representing the movable target, means for transforming indications of altitude from said first selsyn into indications of angle of elevation, means for transmitting the latter indications to one of the reflecting movable members, a second selsyn registering the variations of altitude of the ground in the firing plane between the place where the gunner is located and the movable target and controlling a mask adapted to be disposed on said variable magnifying projector when the movable target is hidden from the gunner by an obstructing part of the ground, a second projector, a second support, gimbals for suspending said second projector from said second support, means for transmitting to said second support indications of angle of elevation and azimuth from said cam shaped member, said second projector projecting on said first plane a luminous spot representing the position of the movable target on the ground, a sighting telescope representing the gun firing at the movable target, means for pointing said telescope in height and azimuth, two associated projectors directing to said screen two beams of light representing the trajectory of a projectile supposedly fired by said gun, means for pointing said two projectors, said pointing means being adjusted before the projectile starts in dependence on the firing data chosen by the gunner through said telescope, means transforming said data after the starting of the projectile has occurred into indications of angle of elevation and azimuth, means for transmitting said indications to said pointing means of said two projectors, and means associated with said two projectors, for projecting on said first plane a luminous point representing the point of intersection of the trajectory of the projectile with the ground.

7. Device for the gunnery instructions on a movable target comprising a vertical screen and a first plane representing a piece of ground, an orientable lighted model simulating a movable target, means for displacing said model, a variable magnifying projector, means for generating a luminous beam by said magnifying projector, means for duplicating the luminous beam generated by said magnifying projector, movable members for reflecting the duplicated beams, a cam shaped member comprising a second plane having a map relief surface, a first support having the shape of a circular sector and supporting said second plane, a pin arranged at the center of the periphery of said circular sector forming said first support, a carriage slidably mounted above said second plane in said first support, two feelers arranged in said carriage and vertically sliding in said carriage by following the map relief surface of said second plane, a first selsyn detecting the variations of the altitude of the ground at the point supporting one of the feelers, said one feeler being tapered, said one feeler representing the movable target, means for transforming indications of altitude from said first selsyn into indications of angle of elevation, means for transmitting the latter indications to one of said reflecting movable members, a second selsyn registering the variations of altitude of the ground in the firing plane between the place where the gunner is located and the movable target and controlling a mask adapted to be disposed on said variable magnifying projector when the movable target is hidden from the gunner by an obstructing part of the ground, a second projector, a second support, gimbals for suspending said second projector from said second support, means for transmitting to said second support indications of angle of elevation and azimuth from said cam shaped member, said second projector projecting on said first plane a luminous spot representing the position of the movable target on the ground, a sighting telescope representing the gun firing at the movable target, means for pointing said telescope in height and azimuth, two associated projectors directing to said screen two beams of light representing the trajectory of a projectile supposedly fired by said gun, means for pointing said two projectors said pointing means being adjusted before the projectile starts in dependence on the firing data chosen by the gunner through said telescope, a constant speed motor starting when the shot occurs, an elevation lowering cam and a distance cam secured to the shaft of said motor and acting on said two projectors, after the starting of the projectile, to impart to the same displacements representing the trajectory of the projectile, means for determining the point of impact on said trajectory, and means associated with said two projectors for projecting on said first plane a luminous point representing the point of intersection of the trajectory of the projectile with the ground.

8. Device for the gunnery instructions on a movable target comprising a vertical screen and a first plane representing a piece of ground, an orientable lighted model simulating a movable target, means for displacing said model, a variable magnifying projector, means for generating a luminous beam by said magnifying projector, means for duplicating the luminous beam generated by said magnifying projector, movable members for reflecting the duplicated beams, a cam shaped member comprising a second plane having a map relief surface, a first support, having the shape of a circular sector and supporting said second plane, a pin arranged at the center of the periphery of said circular sector forming said first support, a carriage slidably mounted above said second plane in said first support, two feelers arranged in said carriage and vertically sliding in said carriage by following the map relief surface of said second plane, a first selsyn detecting the variations of the altitude of the ground at the point supporting one of the feelers, said one feeler being tapered, said one feeler representing the movable target, means for transforming indications of altitude from said first selsyn into indications of angle of elevation, means for transmitting the latter indications to one of said reflecting movable members, a second selsyn registering the variations of altitude of the ground in the firing plane between the place where the gunner is located and the movable target and controlling a mask adapted to be disposed on said variable magnifying projector when the movable target is hidden from the gunner by an obstructing part of the ground, a second projector, a second support, gimbals for suspending said second projector from said second support, means for transmitting to said second support indications of angle of elevation and azimuth from said cam shaped member, said second projector projecting on said first plane a luminous spot representing the position of the movable target on the ground, a sighting telescope representing the gun firing at the movable target, means for pointing said telescope in height and azimuth, two associated projectors directing to said screen two beams of light representing the simulated trajectory of a projectile supposedly fired by said gun, means for pointing said two projectors, said pointing means being adjusted before the projectile starts in dependence on the firing data chosen by the gunner through said telescope, a constant speed motor starting when the shot occurs, an elevation lowering cam and a distance cam secured to the shaft of said motor and acting on said two projectors, after the starting of the projectile, to impart to the same displacements representing the trajectory of the projectile, a pivotable member comprising a third plane having a map relief surface, a set of feelers resting on said surface of said third plane, selsyns cooperating with said set of feelers and transmitting the indications of angle of elevation detected by said feelers, another selsyn which receiving the indications detected by said selsyns cooperating with said set of feelers, said other selsyn receiving on the other hand the indications of angle of elevation derived from said elevation lowering cam, a relay for switching off the feeding of said constant speed motor when the indications of angle of elevation derived from said cam and from one feeler of said set of feelers coincide, and means associated with said two projectors for projecting on said first plane a luminous point representing the point of intersection of the trajectory of the projectile with the ground.

9. Device for the gunnery instructions on a movable target comprising a vertical screen and a first plane representing a piece of ground, an orientable lighted model simulating a movable target, means for displacing said model, a variable magnifying projector, means for generating a luminous beam by said magnifying projector, means for duplicating the luminous beam generated by said magnifying projector, movable members for reflecting the duplicated beams, a cam shaped member comprising a second plane having a map relief surface, a first support having the shape of a circular sector and supporting said second plane, a pin arranged at the center of the periphery of said circular sector forming said first support, a carriage slidably mounted above said second plane in said first support, two feelers arranged in said carriage and vertically sliding in said carriage by following the map relief surface of said second plane, a first selsyn detecting the variations of the altitude of the ground at the point supporting one of said feelers, said one feeler being tapered, said one feeler representing the movable target, means for transforming indications of altitude from said first selsyn into indications of angle of elevation, means for transmitting the latter indications to one of said reflecting movable members, a second selsyn registering the variations of altitude of the ground in the firing plane between the place where the gunner is located and the movable target and controlling a mask adapted to be disposed on said variable magnifying projector when the movable target is hidden from the gunner by an obstructing part of the ground, a second projector, a second support, gimbals for suspending said second projector from said second support, means for transmitting to said second support indications of angle of elevation and azimuth from said cam shaped member, said second projector projecting on said first plane a luminous spot representing the position of the movable target on the ground, a sighting telescope representing the gun firing at the movable target, means for pointing said telescope in height and azimuth, two associated projectors directing to said screen two beams of light representing the trajectory of a projectile supposedly fired by said gun, means for pointing said two projectors, said two projectors, said pointing means being adjusted before the projectile starts in dependence on the firing data chosen by the gunner through said telescope, a constant speed motor starting when the shot occurs, an elevation lowering cam and a distance cam secured to the shaft of said motor and acting on said two projectors, after the starting of the projectile, to impart to same displacements representing the said trajectory of the projectile, a pivotable member comprising a third plane having a map relief surface, a set of feelers resting on said surface of said third plane, selsyns cooperating with said set of feelers and transmitting the indications of angle of elevation detected by said feelers, another selsyn receiving the indications detected by said selsyns cooperating with said set of feelers, said other selsyn receiving on the other hand the indications of angle of elevation derived from said elevation lowering cam, a relay for switching off the feeding of said constant speed motor when the indications of angle of elevation derived from said cam and from one feeler of said set of feelers coincide, another set of feelers for feeling outlines of said model of the movable target in the firing plane so as to supply outline indications, means for adding said outline indications to the indications of angle of elevation and azimuth of said target, a further selsyn receiving the sum of said added indications, a relay for switching off the feeding of said constant speed motor when the said trajectory of the projectile disappears behind the movable target, and means associated with said two projectors for projecting on said first plane a luminous point representing the point of intersection of the trajectory of the projectile with the ground.

GUSTAVE CHARLES AUGUSTE ALRIC.

References Cited in the file of this patent

UNITED STATES PATENTS

| Number | Name | Date |
| --- | --- | --- |
| 1,546,880 | Baranoff | July 21, 1925 |
| 2,131,952 | House | Oct. 4, 1938 |
| 2,392,142 | Gosswiller | Jan. 1, 1946 |
| 2,401,975 | Simjian | June 11, 1946 |
| 2,417,354 | Daly | Mar. 11, 1947 |
| 2,420,633 | Wittel et al. | May 13, 1947 |
| 2,478,250 | Daly et al. | Aug. 9, 1949 |
| 2,491,308 | Gorton et al. | Dec. 13, 1949 |